(12) United States Patent
Nakata

(10) Patent No.: US 9,379,852 B2
(45) Date of Patent: Jun. 28, 2016

(54) PACKET RECOVERY METHOD, COMMUNICATION SYSTEM, INFORMATION PROCESSING DEVICE, AND PROGRAM

(75) Inventor: Tsuneo Nakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 12/439,901

(22) PCT Filed: Sep. 4, 2007

(86) PCT No.: PCT/JP2007/067193
§ 371 (c)(1),
(2), (4) Date: Mar. 4, 2009

(87) PCT Pub. No.: WO2008/029793
PCT Pub. Date: Mar. 13, 2008

(65) Prior Publication Data
US 2010/0046520 A1     Feb. 25, 2010

(30) Foreign Application Priority Data

Sep. 5, 2006    (JP) ................................ 2006-239793

(51) Int. Cl.
     *H04L 1/18*      (2006.01)
     *H04L 1/00*      (2006.01)

(52) U.S. Cl.
     CPC ............ *H04L 1/1867* (2013.01); *H04L 1/1896* (2013.01); *H04L 1/1809* (2013.01); *H04L 2001/0096* (2013.01)

(58) Field of Classification Search
     CPC ..... H04L 47/34; H04L 1/1809; H04L 1/1812; H04L 1/1841; H04L 1/1867; H04L 1/1896; G06F 11/0709; G06F 11/0751; G06F 11/0766; G06F 11/0775; G06F 11/0793

USPC ............... 370/394, 474; 714/48–50, 746–751
See application file for complete search history.

(56) References Cited

U.S. PATENT DOCUMENTS 5,722,051 A *   2/1998   Agrawal et al. ................. 455/69
6,519,731 B1 *   2/2003   Huang et al. ................... 714/751
(Continued)

FOREIGN PATENT DOCUMENTS

EP      1 638 291 A2     3/2006
EP      1 667 395 A1     6/2006
(Continued)

OTHER PUBLICATIONS

International Search Report for PCT/JP2007/067193 mailed Dec. 11, 12007.

(Continued)

*Primary Examiner* — Un C Cho
*Assistant Examiner* — Jeremy Costin

(57) ABSTRACT

A packet recovery method of the present invention is a packet recovery method upon loss of a plurality of packets transmitted from a first node 111 to second node 112 through a network in the order of sequence numbers assigned to each of said packets, wherein second node 112, upon detection of a loss of a packet transmitted from first node 111, transmits an acknowledgement message, including a sequence number of a packet whose receipt has been confirmed or whose loss has been detected and including information on the lost packet, to first node 111 through the network. Then, first node 111, upon receipt of the acknowledgement message from second node 112, assigns a sequence number that is different from that of any of the plurality of packets to a retransmission packet which is a packet to be retransmitted, and subsequently, transmits an acknowledgement-to-acknowledgement message attached to the retransmission packet through the network for notifying that the acknowledgement message has been received to second node 112.

10 Claims, 7 Drawing Sheets

(56) References Cited

U.S. PATENT DOCUMENTS

| | | | |
|---|---|---|---|
| 2005/0074007 A1* | 4/2005 | Samuels et al. | 370/392 |
| 2005/0286527 A1* | 12/2005 | Tieu | H04L 69/163 370/394 |
| 2006/0064464 A1* | 3/2006 | Kakivaya et al. | 709/206 |
| 2006/0092871 A1* | 5/2006 | Nishibayashi et al. | 370/328 |

FOREIGN PATENT DOCUMENTS

| | | |
|---|---|---|
| JP | 8-163128 A | 6/1996 |
| JP | 1996298535 A | 11/1996 |
| JP | 1997046375 A | 2/1997 |
| JP | 1998154085 A | 6/1998 |
| JP | 2001168907 A | 6/2001 |
| JP | 2002217963 A | 8/2002 |
| WO | 98/37670 A1 | 8/1998 |
| WO | 0199355 A | 12/2001 |
| WO | 2005027456 A | 3/2005 |
| WO | 2005067261 A | 7/2005 |
| WO | 2007/095967 A1 | 8/2007 |

OTHER PUBLICATIONS

T. Nakata et al. "Efficient bundling of heterogeneous radio resources for broadband Internet access from moving vehicles", Proceedings of Global Mobile Congress 2004, Oct. 11-13, 2004. Shanghai, China.
Japanese Office Action for JP2008-533159 issued Feb. 14, 2012.
The Extended European Search Report for EP Application No. 07828186.2 dated on Jan. 8, 2014.

* cited by examiner

PACKET RECOVERY METHOD, COMMUNICATION SYSTEM, INFORMATION PROCESSING DEVICE, AND PROGRAM

This application is the National Phase of PCT/JP2007/067193, filed Sep. 4, 2007, which is based upon and claims the benefit of priority from Japanese Patent Application No. 2006-239793, filed Sep. 5, 2006, the disclosure of which is incorporated herein in its entirety be reference.

TECHNICAL FIELD

The present invention relates to a packet recovery method, a communication system, an information processing device, and a program for causing a computer to execute the method.

BACKGROUND ART

When two nodes communicate packets through a network such as the Internet, some packets may be lost. Techniques concerning packet retransmission methods have been proposed as methods of addressing packet loss. JP-9-46375A (hereinafter referred to as "Document 1") discloses an example thereof.

In a technique disclosed in Document 1, the flow and order of transmission packets are controlled between a transmission node and a reception node where, when a queue is caused by packet loss on the reception node, or when the reception node fails to receive packets associated with the queue in a certain time period, the transmission node is notified of a request for retransmitting the packets associated with the queue.

Also, when a plurality of flows exist between two nodes, packet retransmission and order control are conducted on a flow-by-flow basis, for example, using TCP (Transmission Control Protocol (see Standard rfc793) or the like.

Further, if multiplexed losses take place, the reception node prevents redundant retransmissions and restrains delays caused by retransmissions by means of Sack (TCP Selective Acknowledgment Options (see Standard rfc2018)) for simultaneously conveying a plurality of pieces of packet loss information to the transmission node.

Also, when a plurality of paths are available between two nodes, a mobile inverse max (multiplexing technique) is known including means for transmitting retransmission packets, subjected to a retransmission, through a path that has the shortest delay from among the plurality of paths. The mobile inverse max is disclosed in T. Nakata et al., "Efficient bundling of heterogeneous radio resources for broadband Internet Access from moving vehicles" (in proceedings of Global Mobile Congress 2004, Oct. 11-13, 2004, Shanghi, China.) (hereinafter referred to as "Document 2"). The technique disclosed in Document 2 can reduce a delay caused by a retransmission, as compared with a closed retransmission control which is conducted only for a single path.

In the following, the Sack-based packet retransmission control will be described with reference to FIG. 1.

FIG. 1 shows retransmission processing when three packets having sequence numbers 2, 3, 4 are lost within nine packets which have been given sequence numbers 1 through 9 and transmitted by transmission node 101 and.

Upon receipt of packet 201 that has been given the sequence number of 5 from transmission node 101, reception node 102 returns acknowledgement message 301 to transmission node 101. FIG. 1 shows that acknowledge message 301 is returned from reception node 102 to transmission node 101 when reception node 102 has received several packets up to packet 401 having sequence number 6. Acknowledge message 301 includes an Ack field and a Sack field. The Ack field contains "2" which is the smallest sequence number that has been given to an unreceived packet. This is because, in the example of FIG. 1, reception node 102 has received a packet having sequence number 1.

The Sack field is used only when there are received packets which have sequence numbers larger than the one contained in the Ack field. The Sack field includes a Left field and a Right field. Received packets having continuous sequence numbers are grouped into a Block (block), and for each block, the sequence number of the first packet is contained in the Left field, while the smallest sequence number that has been given to an unreceived packet after the block is contained in the Right field.

In the example of FIG. 1, the Sack field shows an acknowledge message which is sent by reception node 102 when it has received several packets up to the packet that has sequence number 6. In this event, there is only one block comprised of packets having sequence numbers 5 and 6. Accordingly, as shown in FIG. 1, "5" is inserted into the Left field, and "7" is inserted into the Right field for this first Sack block.

Upon receipt of acknowledge message 301 from reception node 102, transmission node 101 recognizes from acknowledge message 301 that sequence numbers 1, 5, and 6 have been received, determines that packets having sequence numbers 2, 3, 4 have been lost, and retransmits the lost packets to reception node 102. As shown in FIG. 1, transmission node 101 receives the acknowledge message after the transmission of a packet having sequence number 9, and retransmits the lost packets to reception node 102.

FIG. 1 also shows a scenario where the speed on the transmission path fluctuates to increase the transmission delay for packets having sequence numbers 7 onward. For this reason, not only packets having sequence numbers 7, 8, 9, but also retransmission packets having sequence numbers 2, 3, 4, retransmitted after those packets, are transmitted with a larger transmission delay as compared with that when they were transmitted the first time.

When a plurality of paths are available between two nodes and if such a reduction in speed occurs on one of them, the mobile inverse max disclosed in Document 2 can be used to reduce a delay of retransmission packets. In the following, the technique involved therein will be described with reference to FIG. 2.

FIG. 2 shows that two paths, i.e., path 1 and path 2 are available between transmission node 101 and reception node 102. On path 1, packets having sequence numbers 2, 3, 4 are lost as is the case with FIG. 1, and packets having sequence numbers 7 onward suffer from an increased transmission delay due to a lower speed as compared with previous packets. Path 2 does not suffer from packet loss or lower speed.

Due to the loss of packets having sequence numbers 2, 3, 4, "2" is inserted into the Ack field of acknowledge message 301; "5" is inserted into the Left field associated with the first Sack block; and "7" is inserted into the Right field, as is the case with the example of FIG. 1. Resulting acknowledge message 301 is received by transmission node 101, allowing transmission node 101 to detect the lost packets.

On the other hand, since no packets are lost on path 2, reception node 102 returns acknowledge message 302, which only comprises the Ack field, to transmission node 101. Path 2 nor does suffer from a reduction in packet transmission speed from transmission node 101 to reception node 102. Accordingly, when comparing acknowledgement message 301 on path 1 with acknowledgement message 302 on path 2, which are simultaneously sent from reception node 102 to transmission node 101, the Ack field on path 2 contains a larger sequence number than that on path 1. Shown herein is acknowledgement message 302 with Ack field which contains sequence number 9.

Transmission node 101 predicts from the Ack fields of acknowledgement messages 301, 302 that path 2 has a smaller delay than path 1, and transmits packets having sequence numbers 2, 3, 4 on path 1 to reception node 102 through path 2. Reception node 102 is required to correctly recognize the sequence numbers of the packets retransmitted through path 2 in this way as the sequence numbers on path 1. For this purpose, in this system, each retransmission packet contains information for identifying from which path the packet was sent when it was transmitted the first time.

In this regard, in the example of FIG. 2, the sequence numbers given to packets have different series from one path to another. In the mobile inverse max, a series of sequence numbers can be assigned in units of arbitrary transfers, so that a different identifier is given to each series of sequence numbers. This identifier is referred to as retransmission ID (identification) (see Document 2). In the example of FIG. 2, when a different retransmission ID is given from one path to another, the retransmission ID serves as a path identifier for identifying a path.

Other ways that can be considered for assigning the retransmission ID may include a set of a plurality of TCP or UDP (User Datagram Protocol) sessions, a set of wireless lines belonging to the same wireless system, and the like. In these cases, when the retransmission ID is assigned in correspondence to a session or a line, the session or line can be identified by the retransmission ID, thus making it possible to increase the retransmission speed through a parallel transfer similar to the example of FIG. 2.

DISCLOSURE OF THE INVENTION

The Sack-based transmission shown in FIG. 1 has a problem in which there is a lower efficiency of utilizing a frequency band in communications from reception node 102 to transmission node 101 because the acknowledge message increases in size as the number of Sack blocks increases.

Also, when the acknowledge message is contained in the header of a data packet as in TCP, an increase in the number of Sack blocks causes a problem in which there is a higher susceptibility to packet loss and fragmentation.

The influence of these problems can be alleviated by limiting the number of Sack blocks, but in this event, if a large number of packets are lost, all loss information cannot be contained in the acknowledgement message. As a result, a problem arises in which there is a delay in detecting packets which must be retransmitted, and an increase in packet retransmission delay.

The retransmission by the mobile inverse max effectively speeds up the delivery of retransmission packets, but in the example shown in FIG. 2, packets having sequence numbers 2, 3, 4, retransmitted on path 1 after the loss are received by reception node 102 earlier than the packets having sequence numbers 8, 9 which have been transmitted by transmission node 101 through path 1.

Consequently, a reversed order is detected, and the packets having sequence numbers 8, 9, which are not essentially lost, are erroneously detected to be lost, possibly resulting in retransmission. If packets not lost are redundantly retransmitted in this way, a problem arises in that the band utilization efficiency becomes lower.

On the other hand, if a retransmission packet transmitted through a different path is received by the reception node later than a packet which is transmitted after the retransmission packet, the retransmission packet is again erroneously detected as having been lost, resulting in redundant re-retransmission. Such a reversed order during a transfer will not take place within a FIFO (First-In First-Out) controlled path, but even if each path is FIFO controlled, the reversed order can take place due to inter-path jitter if packets belonging to the same series of sequence numbers are transmitted in parallel from a plurality of paths, like the retransmission by the mobile inverse max.

Also, if an attempt is made to avoid such redundant retransmission due to jitter, a path having a similar delay to a path used for the first transmission must be used in the retransmission as well, so that no selection can be made for such a reliable path which presents a larger delay but a smaller loss, causing a problem of limiting selection for a transmission path in accordance with the situation.

The present invention has been made to solve the problems experienced by the foregoing techniques, and it is an object to provide a packet recovery method for restraining a reduction in band utilization efficiency in packet transmission, a communication system, an information processing device, and a program for causing a computer to execute the method.

A packet recovery method of the present invention is a packet recovery method upon loss of part of a plurality of packets transmitted from a first node to a second node through a network in order of sequence numbers assigned to each of said packets, wherein the second node, upon detection of a loss of a packet transmitted from the first node, transmits an acknowledgement message to the first node through the network, the acknowledgement message including a sequence number of a packet whose reception has been confirmed or whose loss has been detected and including information on a lost packet; the first node, upon receipt of the acknowledgement message from the second node, assigns a sequence number that is different from that of any of the plurality of packets to a retransmission packet which is a packet to be retransmitted and the first node transmits an acknowledgement-to-acknowledgement message for notifying that the acknowledgement message has been received, attached to the retransmission packet, to the second node through the network.

Also, a communication system of the present invention is a communication system having a first node and a second node connected through a network, wherein the first node comprises a control unit, upon receipt of an acknowledgement message including a sequence number of a packet whose receipt has been confirmed or whose loss has been detected by the second node, and including information on a lost packet from the second node after transmitting a plurality of packets to the second node in the order of sequence numbers, for assigning a sequence number that is different from any of the plurality of packets to a retransmission packet which is a packet to be retransmitted, for attaching an acknowledgement-to-acknowledgement message for notifying that the acknowledgement message has been received to the retransmission packet, and for transmitting the retransmission packet to the second node, and the second node comprises a control unit, upon detection of a loss of a packet transmitted from the first node, for transmitting the acknowledgement message to the first node.

An information processing device of the present invention is an information processing device for transmitting packets to another information processing device through a network, which comprises a storage unit for preserving a retransmission packet which is a packet retransmitted to the other information processing device, and a control unit, upon receipt of an acknowledgement message including a sequence number of a packet whose receipt has been confirmed or whose loss has been detected by the other information processing device, and including information on a lost packet from the other information processing device after transmitting a plurality of packets to the other information processing device in the order of sequence numbers, for assigning a sequence number that is different from any of the plurality of packets to the retransmission packet, for attaching an acknowledgement-to-acknowledgement message for notifying that the acknowledgement message has been received to the retransmission packet, and for transmitting the retransmission packet to the other information processing device.

Also, an information processing device of the present invention is an information processing device for receiving packets from another information processing device through a network, which comprises a storage unit for preserving packets received in the order of sequence numbers given to the packets from the other information processing device, and a control unit, upon detection of a loss of part of a plurality of packets transmitted from the other information processing device, for transmitting an acknowledgement message to the other information processing device, the acknowledgement message including a sequence number of a packet whose receipt has been confirmed or whose loss has been detected, and including information on a lost packet, and upon receipt of an acknowledgement-to-acknowledgement message for notifying that the acknowledgement message has been received from the other information processing device, for requesting no retransmission for a packet which has been given a sequence number previous to a sequence number of a packet whose receipt has been confirmed or whose loss has been detected.

A program of the present invention is a program for causing a computer to transmit packets to an information processing device through a network, the program causing the computer to execute processing for transmitting a plurality of packets to the information processing device in the order of sequence numbers, upon receipt of an acknowledgement message including information on a packet whose receipt has been confirmed or whose loss has been detected by the information processing device and including information on a lost packet from the information processing device, for assigning a sequence number different from any of the plurality of packets to a retransmission packet which is a packet to be retransmitted, and for attaching an acknowledgement-to-acknowledgement message for notifying that the acknowledgement message has been received to the retransmission packet, and transmitting the retransmission packet to the information processing device.

A program of the present invention is a program for causing a computer to receive packets from an information processing device through a network, the program causing the computer to execute processing, upon detection of a loss of part of a plurality of packets transmitted from the information processing device in the order of sequence numbers, for transmitting an acknowledgement message to the information processing device, the acknowledgement message including a sequence number of a packet whose receipt has been confirmed or whose loss has been detected, and including information on a lost packet, and upon receipt of an acknowledgement-to-acknowledgement message for notifying that the acknowledgement message has been received from the information processing device, for requesting no retransmission for a packet which is given a sequence number previous to a sequence number of a packet whose receipt has been confirmed or whose loss has been detected.

According to the present invention, it is possible to reduce the amount of data in an acknowledgement message and reduce a lower efficiency of utilizing a frequency band. Also, when first transmission packets and retransmission packets are transmitted in parallel using a plurality of paths, it is possible to prevent redundant retransmissions caused by inter-path jitter.

DESCRIPTION OF REFERENCE NUMERALS

101, 111 Transmission Nodes
102, 112 Reception Nodes
601-1, 601-2 Reception Units
602-1, 602-2 Transmission Units
603 External Transmission Unit
604 External Reception Unit
610 Retransmission Control Unit
620 Scheduling Unit
630 Order Control Unit
701-1-701-3 Order Control Queues
702-1-702-3 Session Queues
703 Retransmission Request Queue

BEST MODE FOR CARRYING OUT THE INVENTION (First Embodiment)

Figure 3:
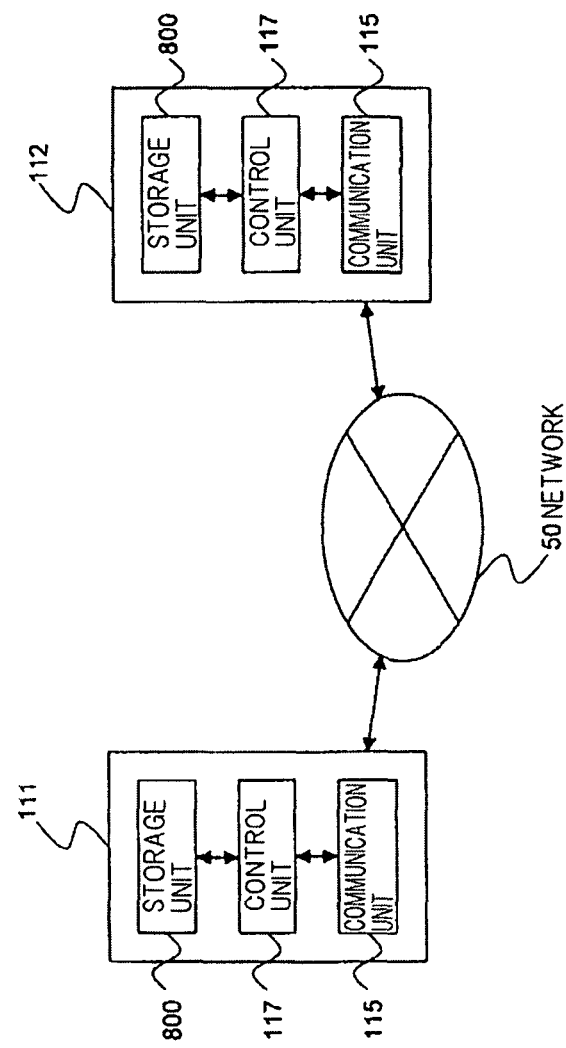
FIG. 3 is a block diagram showing an exemplary configuration of a communication system in a first embodiment.

A description will be given of the configuration of a communication system of this embodiment. FIG. 3 is a block diagram showing an exemplary configuration of the communication system in this embodiment.

Transmission node 111 and reception node 112 shown in FIG. 3 are information processing devices such as computers, PDAs (Personal Digital Assistants), routers, server devices, or the like which are connected through network 50 such as the Internet. In this regard, a router may be provided in network 50 for forwarding packets. Transmission node 111 is comparable to a first node of the present invention, while reception node 112 is comparable to a second node of the present invention.

When packets are transmitted/received between two nodes through network 50, which are not limited to a case where packets are transmitted from one to the other, and there is a reverse case as well, a packet transmission side is herein designated as transmission node 111, and a reception side as reception node 112 for simplifying the description.

Each transmission node 111 and reception node 112 comprises communication unit 115 for transmitting/receiving packets through network 50, storage unit 800 for storing data which is to be transmitted or which has been received, and control unit 117 for controlling transmission/reception of packets. As described above, since transmission node 111 and reception node 112 are such that one serves as the transmission side when the other serves as the reception side, they are similar in device configuration. Control unit 117 comprises a CPU (Central Processing Unit) (not shown) for executing processing in accordance with a program, and a memory (not shown) for storing the program.

However, the CPU executes different programs depending on whether the node serves as the packet transmission side or reception side. For this reason, each node stores both the program that is executed when the node serves as the transmission side and the program that is executed when the node serves as the packet reception side.

When control unit 117 of transmission node 111 identifies a lost packet through acknowledge message 301 received from reception node 112, it gives a sequence number as a new first transmission packet, i.e., a number larger than the last transmitted sequence number, to a retransmission packet. Also, control unit 117 inserts an acknowledgement-to-acknowledgement message (Ack-to-Ack) into a retransmission packet which is first transmitted to reception node 112. Ack-to-Ack is information on the largest sequence number of packets whose reception has been confirmed or whose loss has been detected, received by transmission node 111 from an acknowledgement message from reception node 112. Ack-to-Ack serves as a message for transmission node 111 to notify that an acknowledgement message has been received from the reception node. Then, retransmission packets thus generated are transmitted to reception node 112.

Upon receipt of retransmission packets, control unit 117 of reception node 112 reads Ack-to-Ack within the first received retransmission packet. In this event, control unit 117 need not return an acknowledgement to transmission node 111 for packets previous to the sequence number indicated by Ack-to-Ack. This is because control unit 117 can recognize a situation based upon Ack-to-Ack information with respect to whether or not transmission node 111 recognizes which packets have been received by reception node 112 or which packets have been lost. When an acknowledgement message is transmitted to transmission node 111, the acknowledgement message includes an Ack field which contains the smallest sequence number of a packet that has not been received, after the sequence number indicated by Ack-to-Ack.

Next, a description will be given of operations in packet retransmission processing by the communication system in this embodiment.

Figure 4:
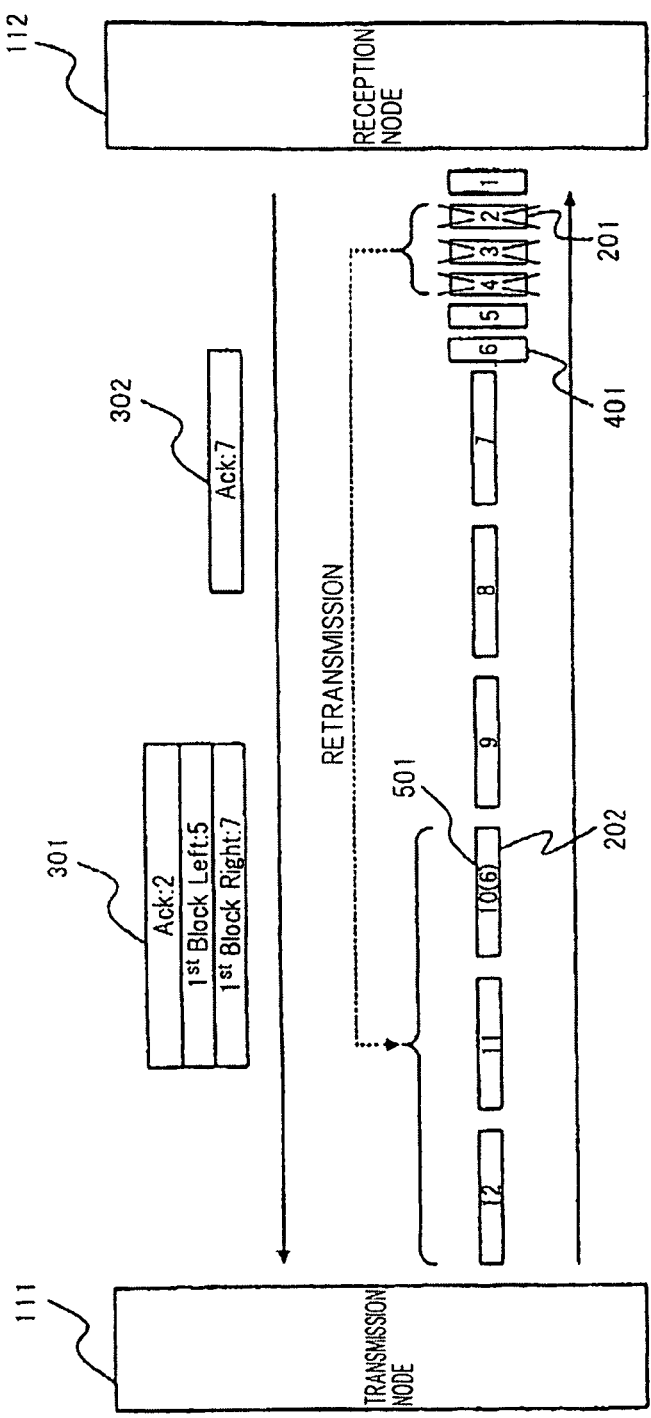
FIG. 4 is a diagram for describing an exemplary operation procedure of the communication system in the first embodiment.
Figure 5:
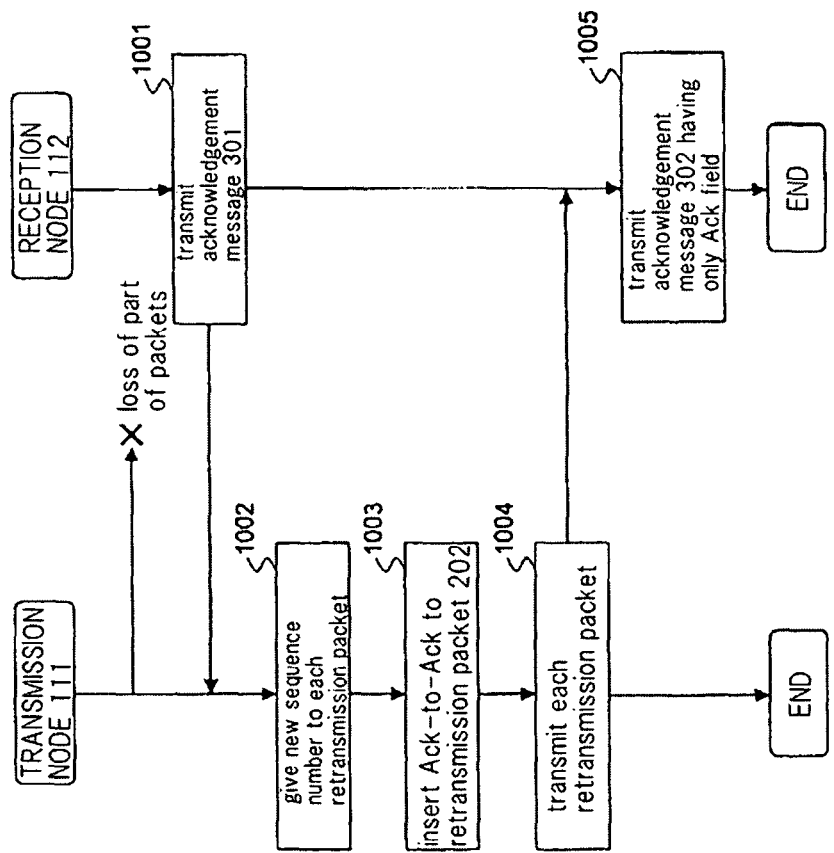
FIG. 5 is a flow chart showing an exemplary operation procedure of the communication system in the first embodiment.

FIG. 4 is a diagram for describing an exemplary operation procedure of the communication system in this embodiment. FIG. 5 is a flow chart showing an exemplary operation procedure of the communication system in this embodiment.

Figure 1:
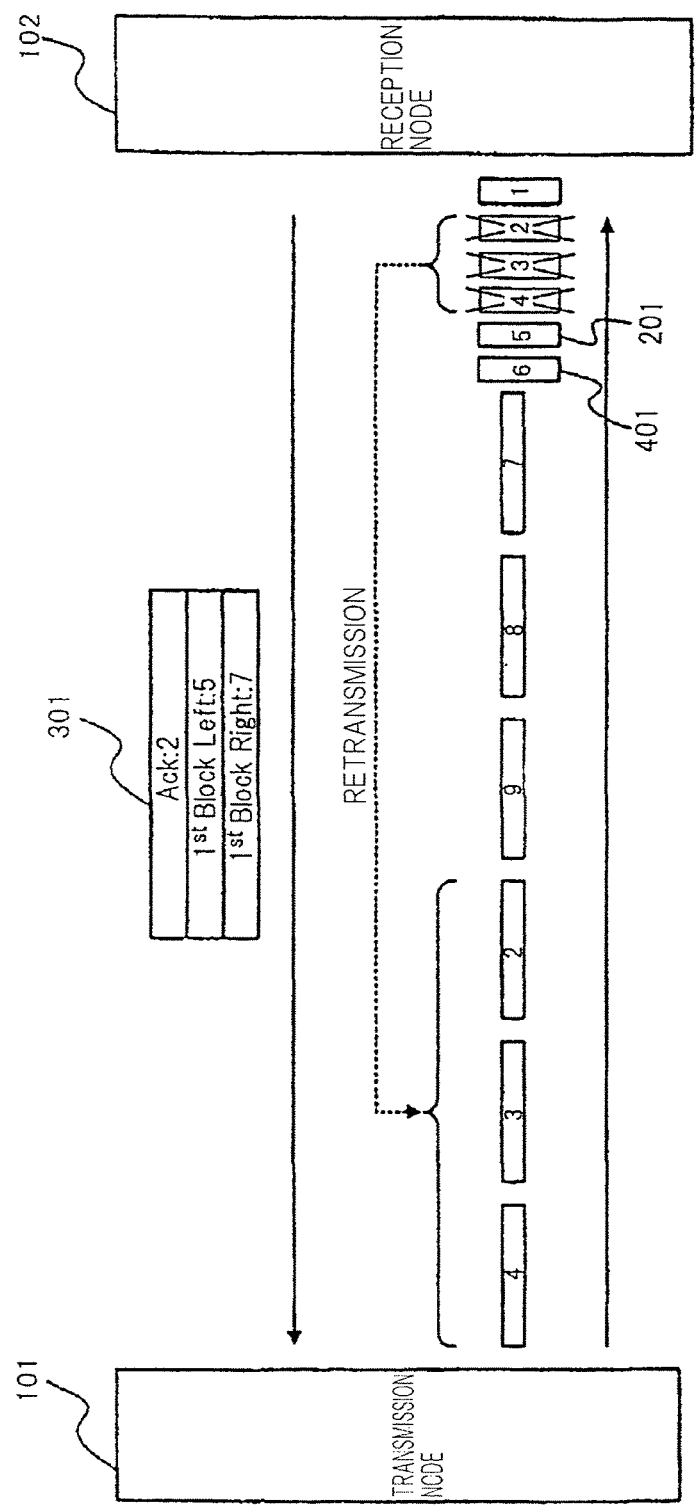
FIG. 1 is a diagram for describing Sack-based packet retransmission control.

Assume that packets having sequence numbers 2, 3, 4 have been lost among packets transmitted by transmission node 111 to reception node 112. When reception node 112 recognizes that packets having sequence numbers 2, 3, 4 have been lost, reception node 112 inserts "2" into the Ack field, inserts "5" into the Left field related to a first Sack block, and inserts "7" into the Right field to generate acknowledgement message 301 in a manner similar to the example shown in FIG. 1. Then, the generated acknowledgement message 301 is transmitted to transmission node 111 (step 1001).

Assume, in the example shown in FIG. 4, that when transmission node 111 receives acknowledgement message 301 from reception node 112, packets having sequence numbers up to "9" have been transmitted from transmission node 111 to reception node 112.

Upon receipt of acknowledgement message 301 from reception node 112, transmission node 111 detects from acknowledgement message 301 that the packets having sequence numbers 2, 3, 4 have been lost. Subsequently, transmission node 111 gives a sequence number as a new first transmission packet, i.e., a number larger than the last transmitted sequence number 9, to a retransmission packet (step 1002).

In the example shown in FIG. 4, retransmission packet 202 of packet 201 which has been given sequence number 2 and which was transmitted for the first time is given new sequence number 10. Likewise, the sequence number of the packet which had the sequence number of 3, when it was transmitted the first time, is changed to "11" when it is retransmitted, and the sequence number of the packet which had the sequence number of 2, when it was transmitted the first time, is changed to "12" when it is retransmitted.

Also, after receiving acknowledgement message 301 from reception node 112, transmission node 111 inserts Ack-to-Ack 501 into retransmission packet 202 which is first transmitted (step 1003). In the example of FIG. 4, since transmission node 111 can recognize from acknowledgement message 301 that packets having sequence numbers up to "6" have been received or have been detected as having been lost, sequence number 6 is inserted into retransmission packet 202 as Ack-to-Ack 501.

Subsequently, transmission node 111 transmits the thus generated retransmission packet to reception node 112 (step 1004). In the example shown in FIG. 4, transmission node 111 transmits, to reception node 112, retransmission packet 202 which includes sequence number 10 and Ack-to-Ack 501, a retransmission packet which is given sequence number 11, and a retransmission packet which is given sequence number 12.

Upon receipt of retransmission packet 202 including Ack-to-Ack 501, reception node 112 reads Ack-to-Ack 501 of retransmission packet 202, and does not return to retransmission node 111 an acknowledgement related to packets previous to sequence number 6 indicated by Ack-to-Ack 501. Thus, reception node 112 need not include information related to packets having sequence numbers 1 through 6 in acknowledgement message 302 when it sends the message to transmission node 111 after the arrival of retransmission packet 202. Information which must be included in acknowledgement message 302 is only an Ack field which contains "7" that is the smallest sequence number of unreceived packets after sequence number 6 (step 1005).

It is understood that in normal Sack, the Sack block cannot be omitted unless all retransmission packets are received for sequence numbers 2, 3, 4, whereas the present invention effectively reduces the amount of data in the acknowledgement message.

As shown in FIG. 4, reception node 112 transmits acknowledgement message 301 to transmission node 111 after detecting reception of the packet having sequence number 6 in this embodiment, but alternatively, the acknowledgement message may be transmitted to transmission node 111 at the time reception node 112 detects that the packet having sequence number 2 is lost.

(Second Embodiment)

The first embodiment relates to packet retransmission processing when there is a single communication path between two nodes, whereas this embodiment relates to packet retransmission processing when a plurality of communication paths are available between two nodes.

A description will be given of the configuration of a communication system of this embodiment. Since an information processing device of this embodiment is similar to that of the first embodiment, aspects different from the first embodiment will be described in detail with reference to FIG. 3.

In this embodiment, assume that there are a plurality of paths within network 50, that are communication paths between transmission node 111 and reception node 112. In the following, for simplifying the description, there are two selectable paths, path 1 and path 2.

In this embodiment, control unit 117 of transmission node 111 generates a retransmission packet which is given a new sequence number, and inserts Ack-to-Ack into a retransmission packet which is first transmitted, in a manner similar to the first embodiment. Then, control unit 117 selects a path from a plurality of paths in accordance with priorities such as early arrival of packets, loss risk distribution, and the like, and transmits retransmission packets to reception node 112 through the selected path. While a variety of selection methods can be contemplated, how to select one path from a plurality of paths has been previously described in the program.

Upon receipt of a retransmission packet, control unit 117 of reception node 112 reads Ack-to-Ack included in the retransmission packet, and transmits an acknowledgement message to the transmission node, in a manner similar to the first embodiment, where the acknowledgement message includes an Ack field which contains the smallest sequence number of unreceived packets after the sequence number indicated by Ack-to-Ack. Control unit 117 need not return the acknowledgement to transmission node 111 for packets previous to the sequence number indicated by Ack-to-Ack.

Next, a description will be given of operations in packet retransmission processing by the communication system in this embodiment.

Figure 6:
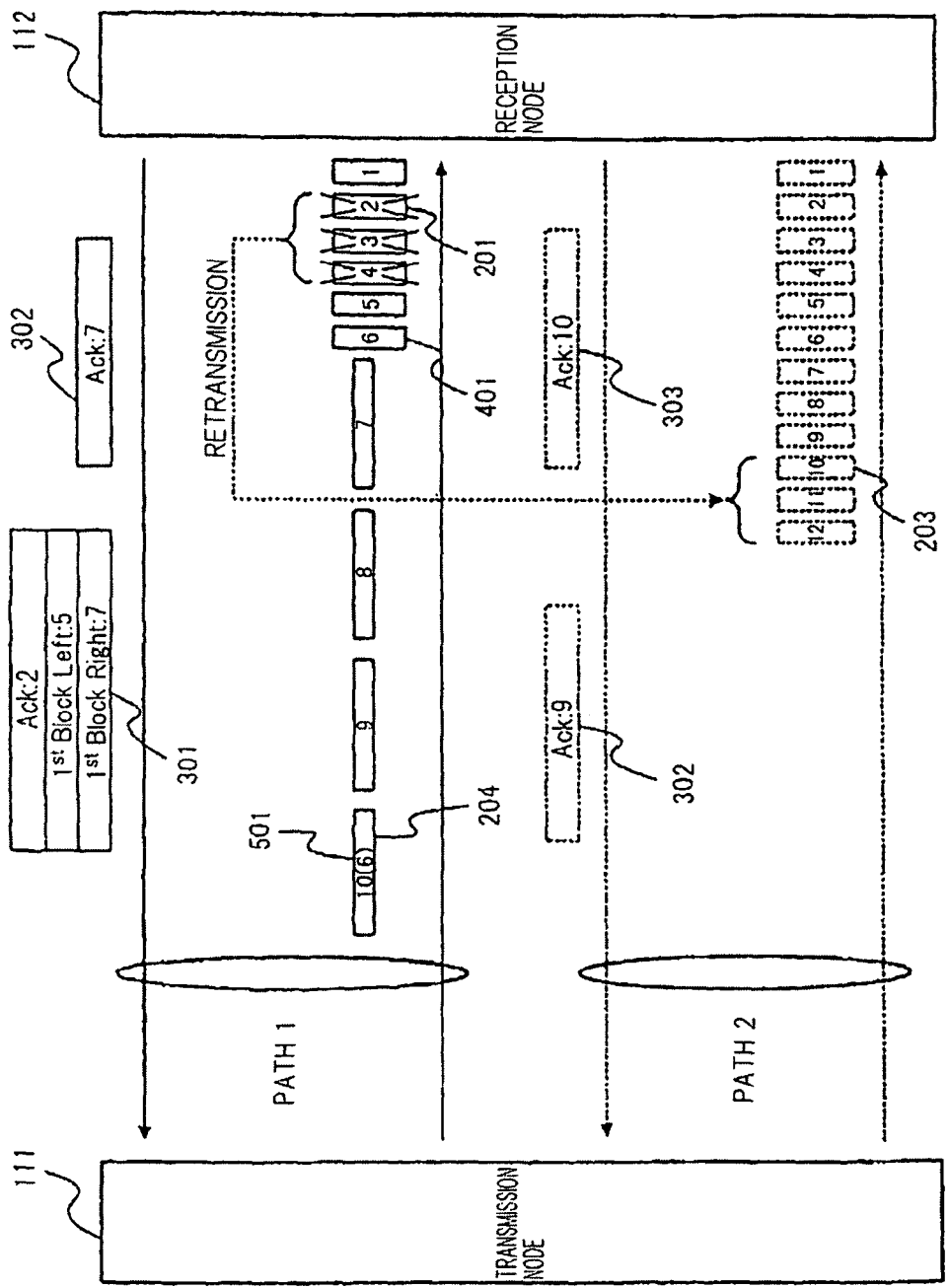
FIG. 6 is a diagram for describing an exemplary operation procedure of a communication system in a second embodiment.

FIG. 6 is a diagram for describing an exemplary operation procedure of the communication system in this embodiment.

Figure 2:
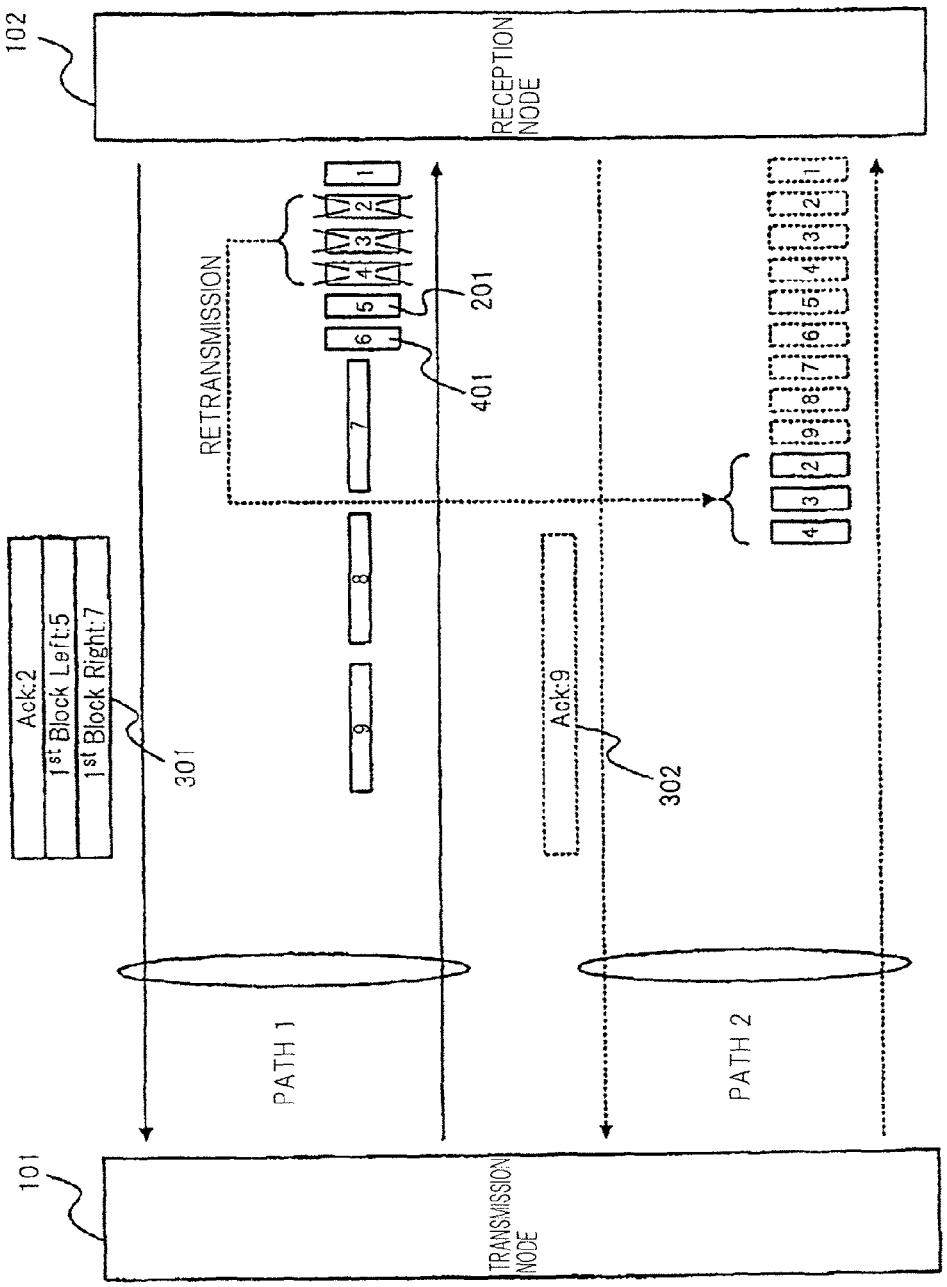
FIG. 2 is a diagram for describing a scenario where a plurality of paths are available between two nodes.

Assume that packets having sequence numbers 2, 3, 4 have been lost from among packets transmitted by transmission node 111 to reception node 112. When reception node 112 recognizes that packets having sequence numbers 2, 3, 4 have been lost, reception node 112 inserts "2" into the Ack field, inserts "5" into the Left field related to a first Sack block, and inserts "7" into the Right field to generate acknowledgement message 301 in a manner similar to the example shown in FIG. 2. Then, generated acknowledgement message 301 is transmitted to transmission node 111.

Assume, in the example shown in FIG. 6, that when transmission node 111 receives acknowledgement message 301 from reception node 112, packets having sequence numbers up to "9" have been transmitted from transmission node 111 to reception node 112 both on path 1 and path 2.

Upon receipt of acknowledgement message 301 from reception node 112, transmission node 111 detects from acknowledgement message 301 that packets having sequence numbers 2, 3, 4 have been lost. Subsequently, transmission node 111 gives a sequence number as a new first transmission packet, i.e., a number larger than the last transmitted sequence number 9, to a retransmission packet.

Also, after receiving acknowledgement message 301 from reception node 112, transmission node 111 inserts Ack-to-Ack 501 into packet 204 which is first transmitted through path 1. In the example of FIG. 6, since transmission node 111 can determine from information of acknowledgement message 301 that packets having sequence numbers up to "6" have been received or have been detected as having lost within those packets transmitted from transmission node 111 to reception node 112 through path 1, the sequence number inserted into packet 204 as Ack-to-Ack 501 is "6."

Transmission node 111 selects a path for the thus generated retransmission packets from a plurality of paths when it transmits the retransmission packet to reception node 112. When earlier arrival is given a higher priority, a path is selected from a state index which can be estimated by transmission node 111 based on information fed back from reception node 112, for example, a delay, a loss ratio and the like. Alternatively, when a higher priority is simply given to the distribution of risk of loss, a path different from that used in the first transmission is selected, for example, if any packet is lost on that path.

In the example shown in FIG. 6, transmission node 111 transmitted packet 201, which was given sequence number 2, to reception node 112 through path 1 in the first transmission, but when the same packet is to be retransmitted, retransmission packet 203 which is given new sequence number 10 is transmitted to reception node 112 through path 2.

Similar to the foregoing, a packet which was given sequence number 3 and transmitted through path 1 in the first transmission is given sequence number 11 and transmitted through path 2 in the retransmission. Also, a packet which was given sequence number 4 and transmitted through path 1 in the first transmission is given sequence number 12 and transmitted through path 2 in the retransmission.

Upon receipt of retransmission packet 203 including Ack-to-Ack 501 through path 2, reception node 112 reads Ack-to-Ack 501 of retransmission packet 203, and does not return to retransmission node 111 an acknowledgement related to packets previous to sequence number 6 indicated by Ack-to-Ack 501. Thus, the Ack field is only information which must be contained in acknowledgement message 302 when reception node 112 sends the message to transmission node 111 after the arrival of retransmission packet 203. The Ack field of acknowledgement message 302 on path 1 contains "7", which is the smallest sequence number of unreceived packets after sequence number 6.

On the other hand, upon receipt of a packet having sequence number 8 through path 2, reception node 112 transmits acknowledgement message 302 which has "9" contained in the Ack field to transmission node 111. Subsequently, upon receipt of a packet having sequence number 9 through path 2, reception node 112 transmits acknowledgement message 303 which has "10" contained in the Ack field to transmission node 111. Afterward, upon receipt of aforementioned retransmission packet 203, reception node 112 transmits acknowledgement message 303 which has "11" contained in the Ack field to transmission node 111. Similar operations are performed for subsequent retransmission packets. This acknowledgement message 303 serves as confirmation information for the fact that reception node 112 has received the retransmission packets sent through path 2.

As shown in FIG. 6, in this embodiment, retransmission packet 203 is transmitted later than packets having sequence numbers 8, 9 transmitted from transmission node 111 through path 1, but arrives at reception node 112 earlier than the two packets through path 1 because it is transmitted through path 2. In this way, reception node 112 receives retransmission packet 203 of sequence number 10 earlier than the packets having sequence numbers 8, 9. However, since reception node 112 processes packets on a path-by-path basis, reception node 112 will not request a retransmission of sequence numbers 8, 9 on path 1 even if it receives the retransmission packet having sequence number 10 through path 2.

In this way, this embodiment effectively prevents redundant retransmissions caused by inter-path jitter when first transmission packets and retransmission packets are transmitted in parallel using a plurality of paths.

The foregoing first and second embodiments have been described in connection with methods of retransmitting packets which have been lost during communication between two nodes. While these methods save the loss of information, a new sequence number is issued each time a packet is retransmitted, so that the reception side cannot restore data in the order in which packets have been transmitted, even if the sequence number is utilized. Accordingly, the present invention should be applied on the assumption that data packets which are given sequence numbers separately include information required to restore the data transmission order.

In the following, a description will be given of an exemplary method of controlling the order in which packets are received.

In order to implement both the aforementioned packet retransmission function and packet order control function in a node, plurality of a series of sequence numbers that are different from each other (see, for example, Document 2) may be applied to the packet retransmission control and order control, respectively.

Figure 7:
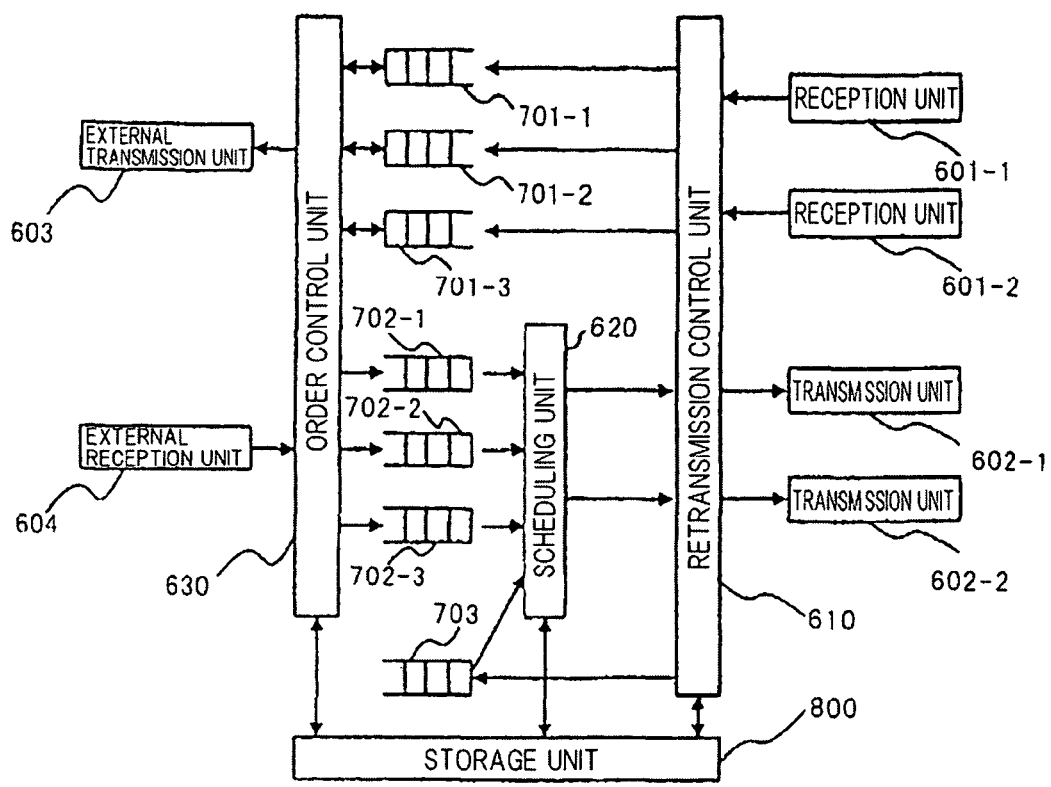
FIG. 7 is a block diagram showing an exemplary configuration of a node which executes packet retransmission control and order control.

FIG. 7 is a block diagram showing an exemplary configuration of a node which executes packet retransmission control and order control. Here, each component is described on the assumption that the node shown in FIG. 7 forwards packets received from the outside to a counterpart node which is the destination of the packets.

Control unit 117 shown in FIG. 3 comprises retransmission control unit 610, scheduling unit 620, and order control unit 630, which are shown in FIG. 7. The CPU executes a program to virtually configure retransmission control unit 610, scheduling unit 620, and order control unit 630. Communication unit 115 shown in FIG. 3 comprises reception units 601-1, 601-2, transmission units 602-1, 602-2, external transmission unit 603, and external reception unit 604, which are shown in FIG. 7.

Also, control unit 117 is provided with order control queues 701-1-701-3 for temporarily preserving packets, session queues 702-1-702-3, and retransmission request queue 703.

External reception unit 604 is applied with data packets from other nodes except for a counterpart node which is the destination of the packets. External transmission unit 603 transmits packets to other nodes including a counterpart node.

Order control unit 630 divides input data packets into forward units for conducting order control, and gives a sequence number to each forward unit for the order control. A forward unit for conducting order control is referred to as the "session," and a sequence number for use in restoration of a transmission order in session units is referred to as the "session sequence number." Order control unit 630 inserts packets which are given the session sequence numbers into session queues 702-1-702-3. In this regard, a sequence number for use in detecting packet loss in packet retransmission processing is referred to as the "retransmission sequence number."

Examples of forward units for conducting order control may include a TCP session, an RTSP (Real Time Streaming Protocol) session and the like, where an end host is burdened with less processing when the order control is held in intermediate nodes.

Transmission units 602-1, 602-2 transmit packets to counterpart nodes, while reception units 601-1, 601-2 receive packets from counterpart nodes. FIG. 7 shows a case where there are two transmission units and two reception units, corresponding to the number of transmission paths.

Scheduling unit 620 retrieves packets from session queues 702-1-702-3, and then determines the path used to transmit each packet to a counterpart node. While an algorithm for determining a transmission path is arbitrary, a PAC (Predict-and-Correct) scheduler can be used, for example, as disclosed in the aforementioned Document 2.

Upon receipt of a packet for which a transmission path has been determined from scheduling unit 620 as first-time transmission processing, retransmission control unit 610 gives a retransmission ID and a retransmission sequence number to the packet which is then sent to the counterpart node through one of transmission units 602-1, 602-2. The retransmission ID is synonymous with the retransmission ID shown in Document 2, and is an identifier for identifying each of the arbitrary retransmission control units.

Here, retransmission is distinguished from one transmission path to the other. In other words, a retransmission ID corresponds one-to-one to a path. Retransmission control unit 610 stores all packets to be transmitted together with corresponding retransmission sequence numbers in storage unit 800 in preparation for retransmission of packets. When the proper node is on the packet reception side, a packet returned to a counterpart node includes an acknowledgement message and Ack-to-Ack as required. The creation of these messages and Ack-to-Ack is performed by retransmission control unit 610 when a packet is received.

Next, a description will be given of packet reception processing when the node shown in FIG. 7 receives a packet from a counterpart node.

Upon receipt of a data packet from the counterpart node through reception units 601-1, 601-2, retransmission control unit 610 inserts the received packet into order control queue 701-1-701-3 in accordance with a session sequence number which has been assigned to the packet. Also, the session sequence number and Ack-to-Ack of the packet is recorded in storage unit 800. Then, retransmission control unit 610 creates an acknowledgement message which is sent to the counterpart node, with reference to session sequence numbers of packets received in the past, which have been previously stored in storage unit 800.

While the acknowledgement message may be attached to an arbitrary data packet transmitted to the counterpart node to notify the counterpart node of the content, a single packet may be transmitted separately from the data packet to notify the counterpart node.

When an acknowledgement message is included in a packet received from the counterpart node, retransmission control unit 610 parses the acknowledgement message to check whether or not any packet is lost. If a loss of packets is detected as a result of the parsing, retransmission control unit 610 extracts packets which must be retransmitted from transmitted packets stored in storage unit 800. The extracted packets are stored in retransmission request queue 703, and these packets are deleted from storage unit 800. The packets stored in retransmission request queue 703 are given session sequence numbers.

A loss of packets may be detected by an arbitrary method, and a method disclosed in Document 2, for example, can be used. However, even in the event of detecting a loss of packets, if the sequence number of a packet to be retransmitted is smaller than a sequence number indicated by received Ack-to-Ack for a corresponding path, it is determined that the counterpart node has confirmed the reception of the packets.

Retransmission control unit 610 does not store packets, for which a determination, with reference to Ack-to-Ack, has been made that the receipt has been confirmed, and does not store packets whose reception at the counterpart node can be confirmed, from the acknowledgement message, in retransmission request queue 703, and deletes corresponding transmitted packets from storage unit 800.

In this regard, if a data packet received from the counterpart node is lost, a retransmission sequence number of the lost packet or the last received packet, from among packets whose reception has been confirmed, is inserted into Ack-to-Ack, and is attached to a packet which is next transmitted.

Next, a description will be given of packet retransmission processing when the node shown in FIG. 7 retransmits packets to the counterpart node.

The retransmission of packets is performed by transmitting packets preserved in retransmission request queue 703. In this event, retransmission request queue 703 is treated as one of session queues. In the following, a specific procedure will be described.

Upon transmission of packets, scheduling unit 602 selects packets to be transmitted, out of session queues 702-1-702-3 and retransmission request queue 703. A path is selected by the aforementioned algorithm irrespective of whichever queue is presented in a selection result. Here, packets in retransmission request queue 703 are selected because the packets are to be retransmitted. Then, when the packets in retransmission request queue 703 are transmitted, the retransmission ID and retransmission sequence number are determined in a similar manner to the first transmission of packets within a session queue.

Order control unit 630 references session sequence numbers of packets temporarily preserved in order control queues 701-1-701-3, and transmits ordered ones to external transmission unit 603. External transmission unit 603 transmits the packets received from order control queues 701-1-701-3 to the counterpart node.

In this embodiment, a first transmission packet and a retransmission packet having the same data are transmitted with different retransmission IDs and retransmission sequence numbers, but the session sequence number is kept unchanged, so that the transmission order can be restored on the reception side.

According to the present invention, the reception node receives a packet with an acknowledgement-to-acknowledgement message attached thereto from the transmission node, and therefore need not notify the transmission node of an acknowledgement message for packets which have sequence numbers smaller than the message. Specifically, upon receipt of an acknowledgement-to-acknowledgement for sequence number n from the transmission node, the reception node treats packets having sequence numbers less than n as received in the creation of a subsequent acknowledgement message, even if a notification for those packets has not been received from the transmission node. Accordingly, after receiving the acknowledgement-to-acknowledgement, it is possible to reduce the number of Sack blocks included in the acknowledgement message. This results in a reduction in the communication load on the network and a reduction of a lower efficiency of utilizing a frequency band.

Also, with a retransmission packet which is given a number determined on the basis of a series of sequence numbers, the reception node can recognize the transmission order even if it receives retransmission packets in an order different from the transmission order.

Also, when a plurality of a series of sequence numbers are available, if another series of sequence numbers provides a higher packet transmission speed than a series of sequence numbers for use in the first transmission, then retransmission packets can be given numbers of the series of sequence numbers which provides a higher transmission speed when they are transmitted.

Also, when a plurality of retransmission IDs are used with a different retransmission ID given by the transmission node on a path-by-path basis, if retransmission packets are transmitted using a path that is different from that used in the first transmission, a different retransmission ID from that in the first transmission is selected. Even if the reception node receives a plurality of packets having the same sequence number, the reception node can arrange the packets in the order in which they are transmitted from the transmission node on each path, by distinguishing the packets based on the retransmission IDs.

Also, the transmission node may include an acknowledgement-to-acknowledgement message in all packets transmitted to the reception node. In this event, each time the reception node receives a packet from the transmission node, the reception node can recognize that the transmission node confirms which packets have been received by the reception node or which packet have been lost.

Further, since retransmission packets are given new retransmission ID and sequence numbers, it is possible to prevent redundant retransmissions which are caused by the influence of jitter between retransmission IDs, as experienced by the mobile inverse max.

It should be understood that the present invention is not limited to the embodiments described above, and a variety of alternations can be made within the scope of the invention and that they are also included in the scope of the invention.

The invention claimed is:

1. A packet recovery method upon loss of part of a plurality of packets transmitted from a first node to a second node through a network in order of sequence numbers assigned to each of said plurality of packets, wherein:

a plurality of a series of sequence numbers are available for packet communication between said first node and said second node through a plurality of different paths in said network, and said plurality of different paths including a first path and a second path;

said first node assigns numbers determined based on a first series of sequence numbers from among said plurality of a series of sequence numbers when said plurality of packets are transmitted to said second node;

said first node transmits said plurality of packets whose numbers are assigned based on said first series of sequence numbers to said second node through said first path;

said second node, upon detection of a loss of a packet from among said plurality of packets transmitted from said first node, transmits an acknowledgement message to said first node through said first path, said acknowledgement message including a Sack (Selective Acknowledgement) block which has information on a sequence number of a packet from among said plurality of packets, whose reception has been confirmed or whose loss has been detected and information on a lost packet from among said plurality of packets;

said first node, upon receipt of said acknowledgement message from said second node and when a retransmission packet which is a packet from among said plurality of packets is transmitted to said second node, assigns to said retransmission packet a sequence number which is a number pertinent to a first-time transmission packet subsequent to a final sent packet with second series of sequence numbers being different from said first series of sequence numbers when said retransmission packet is transmitted to said second node, each number of said second series of sequence numbers being different from each number of said first series of sequence numbers;

said first node includes information on a sequence number of a packet from among said plurality of packets, whose reception has been confirmed or whose loss has been detected in an acknowledgement-to-acknowledgement message for notifying that said acknowledgement message has been received and transmits said acknowledgement-to-acknowledgement message attached to said retransmission packet, to said second node through said second path, such that said second node does not resend said acknowledgment message to said first node upon receiving said acknowledgement-to-acknowledgement message; and said second node, upon receipt of said acknowledgement-to-acknowledgement message, does not request a retransmission for a packet from among said plurality of packets, which has been assigned a sequence number previous to a notified sequence number.

2. The packet recovery method according to claim 1, wherein:
said first node assigns a number pertinent to a first-time transmission packet following a final packet of said plurality of packets, as a sequence number for said retransmission packet.

3. The packet recovery method according to claim 1, wherein:
said first node assigns said sequence number to said retransmission packet such that said sequence number of said retransmission packet is not identical to any other sequence number.

4. The packet recovery method according to claim 1, wherein:
said first node includes said acknowledgement-to-acknowledgement message in all retransmission packets which will be transmitted to said second node.

5. A communication system having a first node and a second node connected through a network, wherein:
said first node comprises a control unit, upon receipt of an acknowledgement message including a Sack (Selective Acknowledgement) block which has information on a sequence number of a packet from among a plurality of packets, whose receipt has been confirmed or whose loss has been detected by said second node, and information on a lost packet from among said plurality of packets, from said second node after transmitting said plurality of packets to said second node in an order of sequence numbers, for assigning a sequence number that is different from any of said plurality of packets to a retransmission packet which is a packet from among said plurality of packets, to be retransmitted, for attaching an acknowledgement-to-acknowledgement message for notifying that said acknowledgement message has been received to said retransmission packet or said plurality of packets, and for transmitting said retransmission packet to said second node; and said second node comprises a control unit, upon detection of a loss of a packet transmitted from said first node, for transmitting said acknowledgement message to said first node, said second node not resending said acknowledgment message to said first node upon receiving said acknowledgement- to- acknowledgement message, wherein:
a plurality of a series of sequence numbers are available for packet communication between said first node and said second node through a plurality of different paths, said plurality of different paths including a first path and a second path;

said control unit of said first node assigns numbers determined based on a first series of sequence numbers from among said plurality of a series of sequence numbers when said plurality of packets are transmitted to said second node, and assigns to said retransmission packet a sequence number which is a number pertinent to a first-time transmission packet subsequent to a final sent packet with second series of sequence numbers being different from said first series of sequence numbers when said retransmission packet is transmitted to said second node, each number of said second series of sequence numbers being different from each number of said first series of sequence numbers;

said control unit of said first node transmits said plurality of packets whose numbers are assigned based on said first series of sequence numbers to said second node through said first path, and transmits said retransmission packet whose number is assigned based on said second series of sequence numbers to said second node through said second path;

said control unit of said second node, upon receipt of said acknowledgement-to-acknowledgement message, does not request a retransmission for a packet from among said plurality of packets, which has been assigned a sequence number previous to a notified sequence number; and said control unit of said first node includes information on a sequence number of a packet from among said plurality of packets, whose reception has been confirmed or whose loss has been detected in said acknowledgement-to-acknowledgement message.

6. The communication system according to claim 5, wherein:
said control unit of said first node assigns a number pertinent to a first-time transmission packet following a final packet of said plurality of packets, as a sequence number for said retransmission packet.

7. The communication system according to claim 5, wherein:
said control unit of said first node assigns said sequence number to said retransmission packet such that said sequence number of said retransmission packet is not identical to any other sequence number.

8. The communication system according to claim 5, wherein:
said control unit of said first node includes said acknowledgement-to-acknowledgement message in all retransmission packets which will be transmitted to said second node.

9. An information processing device for transmitting a plurality of packets to another information processing device through a network, comprising:
a storage unit that preserves a retransmission packet which is a packet from among said plurality of packets, retransmitted to said another information processing device; and a CPU (Central Processing Unit) that, upon receipt of an acknowledgement message for notifying a request for retransmitting a packet, said acknowledgment message including a Sack (Selective Acknowledgement) block which has information on a sequence number of a packet from among said plurality of packets, whose receipt has been confirmed or whose loss has been detected by said another information processing device, and information on a lost packet from among said plurality of packets, from said another information processing device after transmitting said plurality of packets to said another information processing device in an order of sequence numbers, assigns a sequence number that is different from any of said plurality of packets to said retransmission packet, for attaching an acknowledgement-to-acknowledgement message for notifying that said acknowledgement message has been received to said retransmission packet or said plurality of packets, and transmits said retransmission packet to said another information processing device, such that said another information processing device does not resend said acknowledgment message upon receiving said acknowledgement-to-acknowledgement message, wherein:

a plurality of a series of sequence numbers are available for packet communication between said information processing device and said another information processing device through a plurality of different paths, said plurality of different paths including a first path and a second path;

said CPU assigns numbers determined based on a first series of sequence numbers from among said plurality of a series of sequence numbers when said plurality of packets are transmitted to said another information processing device;

said CPU assigns to said retransmission packet a sequence number which is a number pertinent to a first-time transmission packet subsequent to a final sent packet with second series of sequence numbers being different from said first series of sequence numbers when said retransmission packet is transmitted to said another information processing device, each number of said second series of sequence numbers being different from each number of said first series of sequence numbers;

said CPU transmits said plurality of packets whose numbers are assigned based on said first series of sequence numbers to said another information processing device through said first path, and transmits said retransmission packet whose number is assigned based on said second series of sequence numbers to said another information processing device through said second path; and said CPU includes information on a sequence number of a packet from among said plurality of packets, whose reception has been confirmed or whose loss has been detected in said acknowledgement-to-acknowledgement message.

10. A processor, executing a program product for causing a computer to transmit a plurality of packets to an information processing device through a network, in a memory, said program product causing said computer to execute processing for:

transmitting said plurality of packets to said information processing device in an order of sequence numbers;

upon receipt of an acknowledgement message for notifying a request for retransmitting a packet, said acknowledgment message including a Sack (Selective Acknowledgement) block which has information on a sequence number of a packet from among said plurality of packets, whose receipt has been confirmed or whose loss has been detected by said information processing device and information on a lost packet from among said plurality of packets, from said information processing device, assigning a sequence number different from any of said plurality of packets to a retransmission packet which is a packet from among said plurality of packets, to be retransmitted; and attaching an acknowledgement-to-acknowledgement message for notifying that said acknowledgement message has been received to said retransmission packet or said plurality of packets, and transmitting said retransmission packet to said information processing device, such that said information processing device does not resend said acknowledgment message upon receiving said acknowledgement-to-acknowledgement message, wherein:

a plurality of a series of sequence numbers are available for packet communication between said computer and said information processing device through a plurality of different paths including a first path and a second path;

said program product causing said computer to execute processing for:

assigning numbers determined based on a first series of sequence numbers from among said plurality of a series of sequence numbers when said plurality of packets are transmitted to said information processing device;

assigning to said retransmission packet a sequence number which is a number pertinent to a first-time transmission packet subsequent to a final sent packet with second series of sequence numbers being different from said first series of sequence numbers when said retransmission packet is transmitted to said information processing device, each number of said second series of sequence numbers being different from each number of said first series of sequence numbers;

transmitting said plurality of packets whose numbers are assigned based on said first series of sequence numbers to said information processing device through said first path, and transmitting said retransmission packet whose number is assigned based on said second series of sequence numbers to said information processing device through said second path; and including information on a sequence number of a packet from among said plurality of packets, whose reception has been confirmed or whose loss has been detected in said acknowledgement-to-acknowledgement message.

* * * * *